United States Patent [19]

Bolin et al.

[11] Patent Number: 4,842,637
[45] Date of Patent: Jun. 27, 1989

[54] GLASSWARE FORMING MACHINE WITH COOLING SYSTEM

[75] Inventors: James A. Bolin, Tulsa, Okla.; Irving Powers, Ladue, Mo.

[73] Assignee: Glass Technology Development Corp., Sapulpa, Okla.

[21] Appl. No.: 157,460

[22] Filed: Feb. 17, 1988

Related U.S. Application Data

[63] Continuation-in-part of Ser. No. 67,238, Jun. 25, 1987, abandoned.

[51] Int. Cl.⁴ .............................................. C03B 9/38
[52] U.S. Cl. ........................................ 65/265; 65/267; 65/319; 65/356
[58] Field of Search ............... 65/242, 260, 265, 267, 65/319, 356

[56] References Cited

U.S. PATENT DOCUMENTS

| | | | |
|---|---|---|---|
| 2,751,715 | 6/1956 | Denman | 65/319 X |
| 3,653,870 | 4/1972 | Foster et al. | 65/356 |
| 3,849,101 | 11/1974 | Wythe et al. | 65/355 |
| 4,251,253 | 2/1981 | Becker et al. | 65/267 |
| 4,361,434 | 11/1982 | Schneider | 65/265 |
| 4,388,099 | 6/1983 | Hermening et al. | 65/267 |
| 4,426,218 | 1/1984 | Cabrera-Montanté et al. | 65/267 X |
| 4,512,792 | 4/1985 | Irwin et al. | 65/265 X |
| 4,561,875 | 12/1985 | Foster | 65/267 |
| 4,657,573 | 4/1987 | Jones | 65/267 X |
| 4,690,703 | 9/1987 | Kulig | 65/265 |

FOREIGN PATENT DOCUMENTS

26747 10/1984 Australia .

*Primary Examiner*—Arthur Kellogg
*Attorney, Agent, or Firm*—Senniger, Powers, Leavitt and Roedel

[57] ABSTRACT

A cooling system for a glassware forming machine in which air is delivered to each of two plenums for upward flow of air through vertical passages in mold members on the plenums from an air outlet on the base of the machine via an air duct having a horizontal section, an inlet section extending down from one end of the horizontal section into a hole in an oscillable disk closing the outlet and an outlet section extending up from the other end of the horizontal section into a hole in the plenum.

19 Claims, 11 Drawing Sheets

GLASSWARE FORMING MACHINE WITH COOLING SYSTEM

CROSS-REFERENCE TO RELATED APPLICATION

This application is a continuation-in-part of U.S. application Ser. No. 07/067,238 filed June 25, 1987 now abandoned.

BRIEF SUMMARY OF THE INVENTION

This invention relates to glassware forming machines, and more particularly to a cooling system for the mold members of such a machine for forming glass bottles.

This invention is especially directed to cooling systems for the mold members of glassware forming machines of the type such as shown in U.S. Pat. Nos. 3,849,101, 4,251,253, 4,361,434, 4,388,099 and 4,561,875 wherein air is blown through passages in the mold members for cooling them, among the several objects of the invention being the provision of an improved simplified, compact system for delivering air to the mold members for upward flow of air through the air passages therein allowing for their swinging toward and away from one another between their open and closed positions, providing for relatively low restriction to flow of air and relatively uniform and efficient cooling of the mold members for production of glassware (especially bottles) at relatively high speed with relatively few defects, relatively low energy consumption in blowing air, and relatively low noise levels; and the provision of such a system wherein wear of parts is reduced for longer life of the system.

In certain respects the invention involves an improvement over the cooling system disclosed in U.S. patent application Ser. No. 081,148, of James A. Bolin filed application Ser. No. 081,148, of James A. Bolin filed Aug. 3, 1987 now U.S. Pat. No. 4,750,929 as of U.S. patent application Ser. No. 010,483, now abandoned, of James A. Bolin, filed as a continuation of U.S. patent application Ser. No. 859,644 now abandoned, filed May 5, 1986, said applications being incorporated herein by reference.

In general, the invention is embodied in a glassware forming machine comprising a pair of carriers each pivoted on a generally vertical fixed first axis for swinging movement toward and away from each other between an open position and a closed position, and a plurality of mold members carried by each carrier, each mold member on each carrier being related to a mold member on the other so that, with the carriers in the closed position, each mold member on one carrier mates with a mold member on the other to define a mold cavity for molding an item of glass. Each mold member has air passages extending upwardly from the bottom thereof for passage of air therethrough for cooling. Means is provided for blowing air through said air passages comprising a plenum carried by each carrier for delivering air to the air passages of the mold members carried by the carrier, the mold members extending up from the plenum and the plenum having ports at the top thereof for flow of air up into the passages in the mold members and thence up through and out of said passages, means providing a chamber below said carriers for air to be blown into the plenums and thence up through said air passages, and means for delivery of air from said chamber means to each plenum allowing swing of the carriers. The delivery means comprises, for each carrier, means defining an air outlet at the top of the chamber means. The air outlet means has a generally flat top with an opening therethrough in communication with said chamber for delivery of air from said chamber up through said opening. A generally flat circular closure overlying the opening in the top of said outlet means is oscillable on its center on a generally vertical axis spaced from the carrier axis, and said closure and the top of the outlet means have adjacent annular surfaces centered in the closure axis inhibiting air from escaping at the periphery of the closure from between the closure and the top of the outlet means. The closure has a circular hole extending therethrough from its top to its bottom spaced from its axis. The plenum has a bottom wall with an opening therein, and air duct means is provided for flow of air from the outlet to the plenum having a generally horizontal section, an inlet end section extending down from one end thereof into the hole in the closure and an outlet end section extending up from the other end thereof to the opening in the bottom wall of the plenum. The inlet end section is in communication at its lower end with said outlet, and the inlet end section and said closure are relatively rotatable in generally sealed relation with respect to the circular hole in the closure. The outlet end section is relatively rotatable in generally sealed relation with respect to the opening in the bottom wall of the plenum. The circular closure is oscillable on its axis through an angle in one direction from a first position to a second position on swinging of the respective plenum with the respective carrier from open to closed position and back in the opposite direction to its first position on swinging of the respective plenum with the respective carrier back to open position, air flowing up from said outlet passing directly upwardly through the inlet end section to the horizontal section, thence through the horizontal section, and thence up through the outlet end section of the air duct means to the plenum throughout the oscillation of the closure.

In a modification, the mold members are of a type for molding a blank to be transferred to molding means for forming the blank into a container, and the machine has means for molding the blank with a neck for the container and a finish on the neck. The neck-molding means comprises a pair of mating neck mold halves one of which fits in one of said mold members and the other of which fits in the other of said mold members at the lower end thereof. The neck mold halves when closed define a cavity for the molding of the neck and the finish. Each of the neck mold halves has a plurality of grooves extending vertically in the periphery thereof, and each of said mold members has passages extending inwardly from respective air passages therein to the grooves in the periphery of the neck mold halves for flow of air from said respective air passages to the grooves and thence down in the grooves and out at the bottom of the mold members for cooling the neck mold halves.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
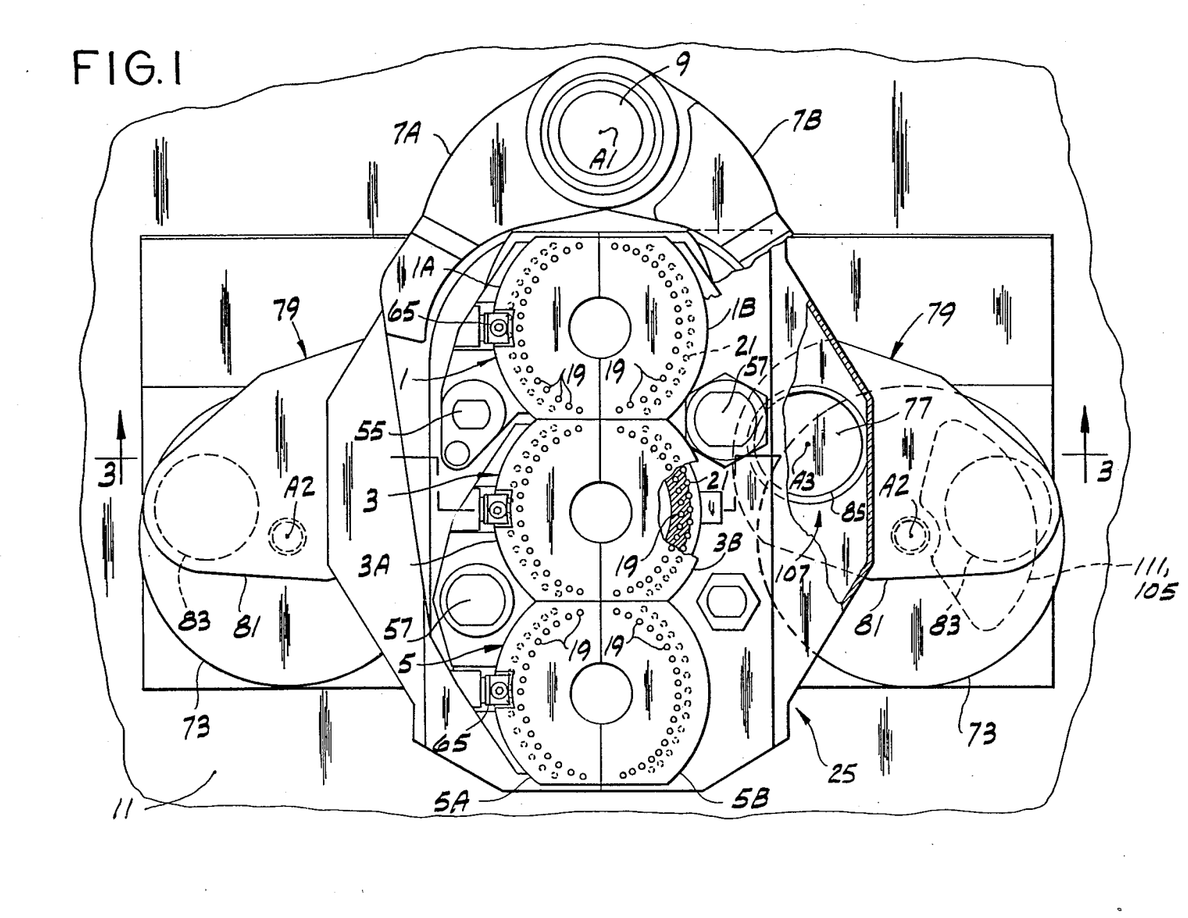
FIG. 1 is a plan, with parts broken away and shown in section, of the mold side of an individual section of a glassware forming machine in which the present invention is embodied, the mold carriers and mold members on the mold side of said section of the machine being shown in closed position.
Figure 2:
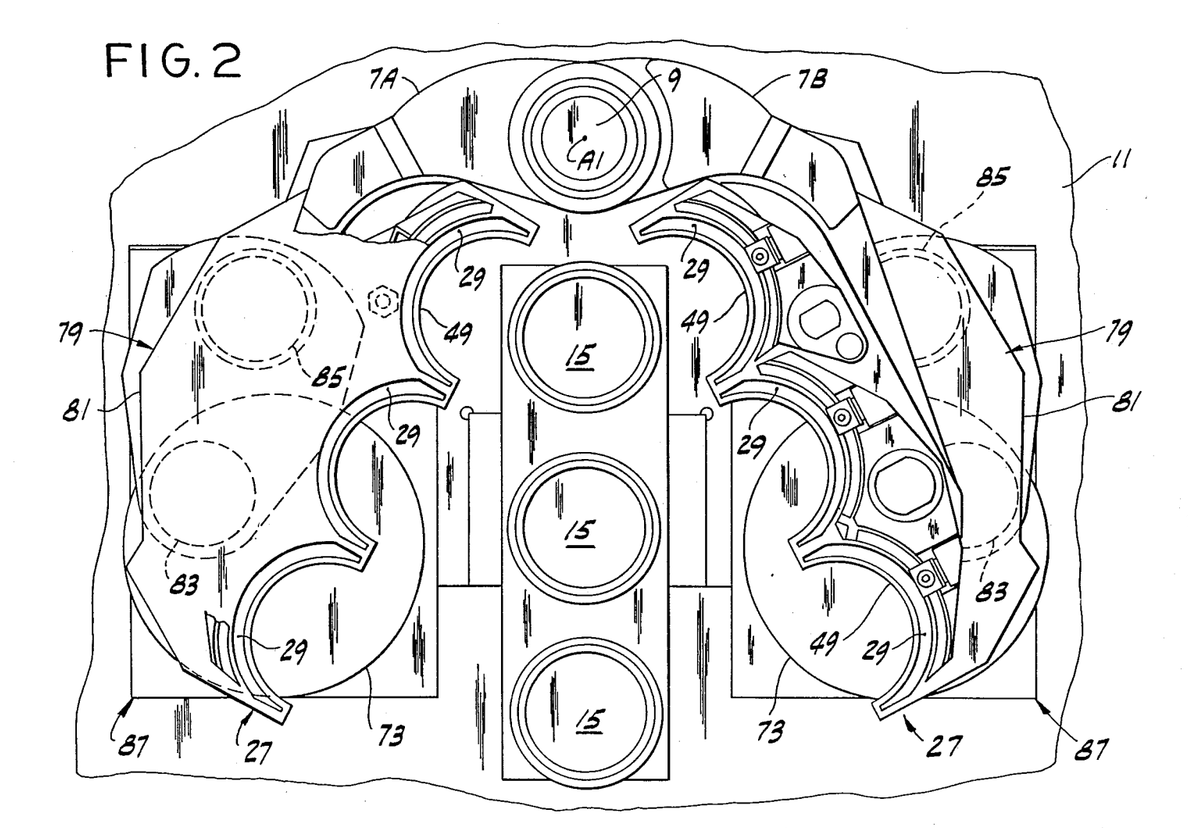
FIG. 2 is a view similar to FIG. 1 with the mold members removed showing the mold carriers in open position.

Referring to FIGS. 1–8 of the drawings, the invention is illustrated as it is embodied on what is called the "mold side" of an individual section of a cyclically operating glassware forming machine of the individual section type, such as referred to in the above-noted U.S. Pat. No. 4,561,875 and in said Bolin U.S. patent applications, for cooling the mold members in which a parison or blank, formed on the parison or blank molding side of the section, is blown to form the final product, e.g. a bottle. The invention may also be embodied in the blank molding side of a section for cooling the blank mold members on that side. As illustrated in FIG. 1, the stated section of the glassware forming machine is of the type referred to as a triple gob section, comprising three pairs 1, 3 and 5 of mold members for molding three bottles at a time, each member constituting a mold half. It will be understood that the invention is applicable to glassware forming machine sections other than a triple gob section, e.g. a two-gob section. The two members of the first pair are designated 1A and 1B, the two members of the second pair are designated 3A and 3B and the two members of the third pair are designated 5A and 5B. The three mold members 1A, 3A and 5A are carried by a carrier 7A and the three mold members 1B, 3B, 5B are carried by a carrier 7B, the carriers being pivoted on a first and fixed generally vertical axis indicated at Al for swinging movement toward and away from each other between the closed position in which they are illustrated in FIG. 1, wherein mold members 1A and 1B, 3A and 3B, 5A and 5B and closed on each other for the blow molding of a blank into a bottle in each of the closed pairs of members, and the open position in which they are illustrated in FIG. 2, wherein the two mold members of each pair of mold members are spaced from each other for entry therebetween of blanks and for removal of completed bottles. The carriers 7A and 7B are pivoted on a vertical shaft 9 which extends up from the top of a base 11 of the stated individual section of the glassware forming machine, suitable mechanism well-known in the art being provided for cyclically swinging the carriers between their open and closed positions for the bottle molding process.

Each mold member 1A, 1B, 3A, 3B, 5A and 5B constitutes a mold half, having a cavity 13 therein which is shaped in accordance with the shape of a bottle to be formed so that, with the two mold halves brought together in closed position, the cavities of the two halves define the shape of the wall and part of the neck of the bottle. At the bottom, the two mold halves of each pair closes on a mold bottom member 15 as well known in the art. The bottom of the bottle is formed against the mold bottom member 15, and the bottle is supported on the latter when the mold halves open. Each mold half has a generally arcuate peripheral wall 17 having air passages such as indicated at 19 and 21 extending upwardly from the bottom thereof, each of these passages opening into the ambient atmosphere at its upper end for passage of air through the passages for cooling the mold half, the air exiting into the ambient atmosphere from the upper ends of the passages. Passages 19 constitute an inner group of passages extending from bottom to top of the mold half on part of an inner circle. Passages 21 constitute an outer group of passages in an enlarged-diameter lower part 23 of the mold half on part of an outer circle, these passages opening into the ambient atmosphere at the top of said lower part 23 (see FIG. 3).

Means designated 25 in its entirety is provided for blowing air through the air passages 19 and 21 in both the open and closed positions of the mold halves, comprising a plenum 27 carried by each of the carriers 7A and 7B. The mold halves 1A etc. carried on each carrier extend up from the plenum on that carrier, the plenum having ports 29 (see FIGS. 2 and 3) at the top thereof for flow of air up into the passages 19 and 21 in the mold halves on the plenum and thence up through and out of the passages. Each plenum has a relatively shallow inner section 31 and a relatively deep outer section 33, these sections having a common flat top wall 35, this wall and other walls of the plenum defining a plenum chamber 47. At the inside, the plenum is of scalloped formation having three scallops each designated 49, one for each of the three respective mold halves carried on the plenum. Each mold half has a reduced-diameter lower end portion 51 which fits in a respective scallop as appears in FIG. 3. At the upper end of the reduced-diameter lower end portion, each mold half has an outwardly extending downwardly facing flat horizontal shoulder portion 53 which seats on the top wall of the respective plenum around the respective scallop. The passages 19 and 21 extend upward from this shoulder, and each of the ports 29 is constituted by an arcuate slot in the top wall 35 of the plenum adjacent the respective scallop. Each mold half is removably associated in suitable manner with the respective plenum with the lower ends of the passages 19 and 21 of the mold half in register with a respective slot 29. Extending up from the top wall 35 of each plenum are studs 55 and 57 by means of which the plenum is secured to parts 59 and 61 on the respective carrier or arm 7A, 7B. Each mold half is associated with a respective part 59, 61 as indicated 63 and 65 in FIG. 3.

Figure 3:
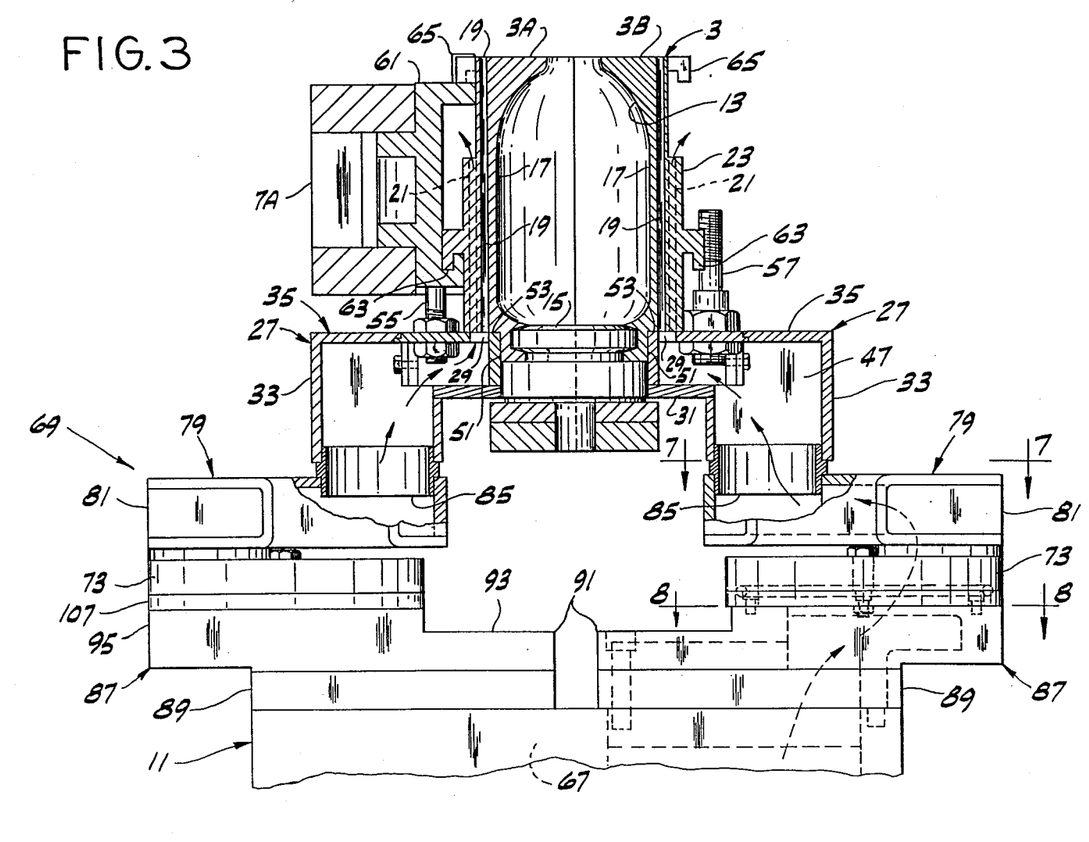
FIG. 3 is an enlarged vertical section generally on line 3—3 of FIG. 1.
Figure 4:
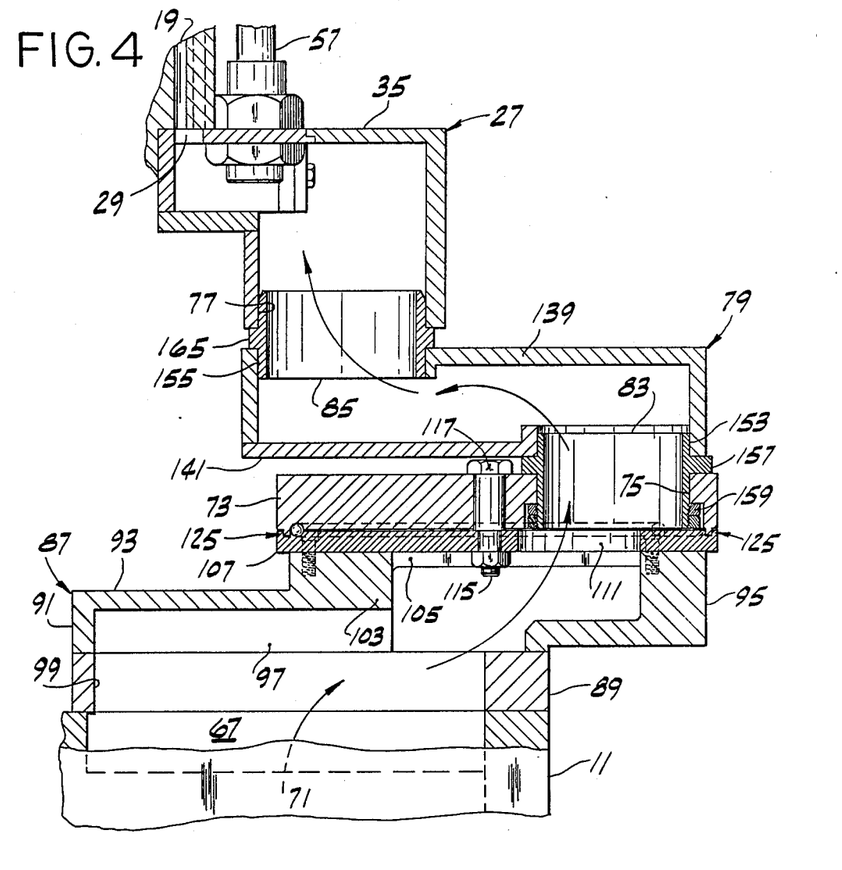
FIG. 4 is an enlarged vertical section similar to FIG. 3.
Figure 5:
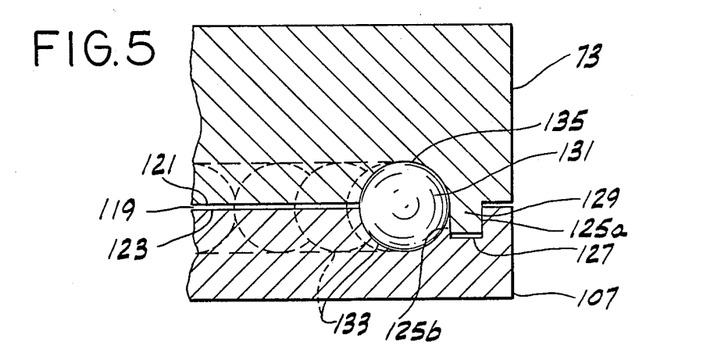
FIG. 5 is an enlarged fragmentary detail section.
Figure 6:
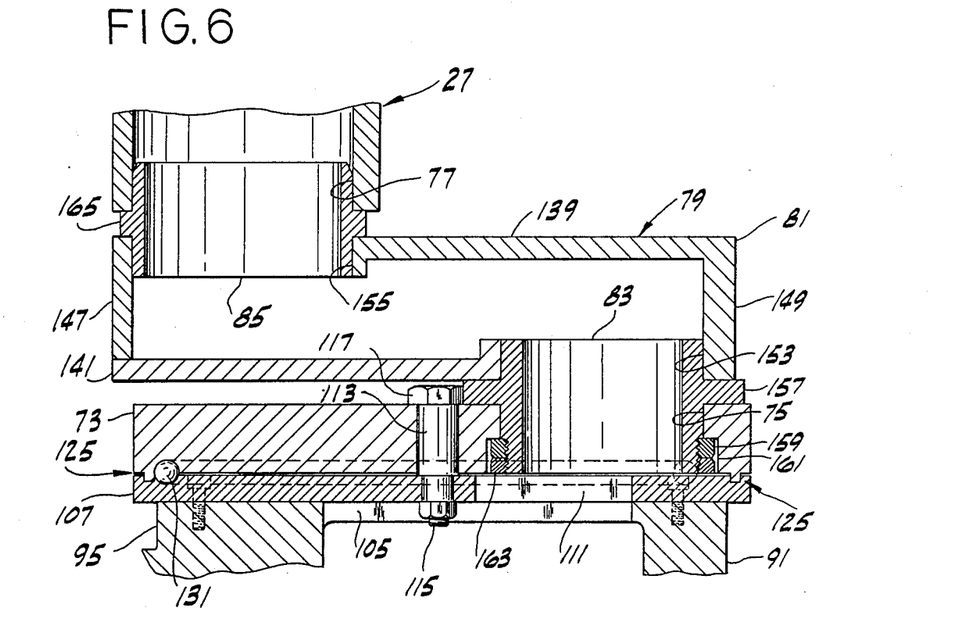
FIG. 6 is an enlargement of part of FIG. 4.
Figure 7:
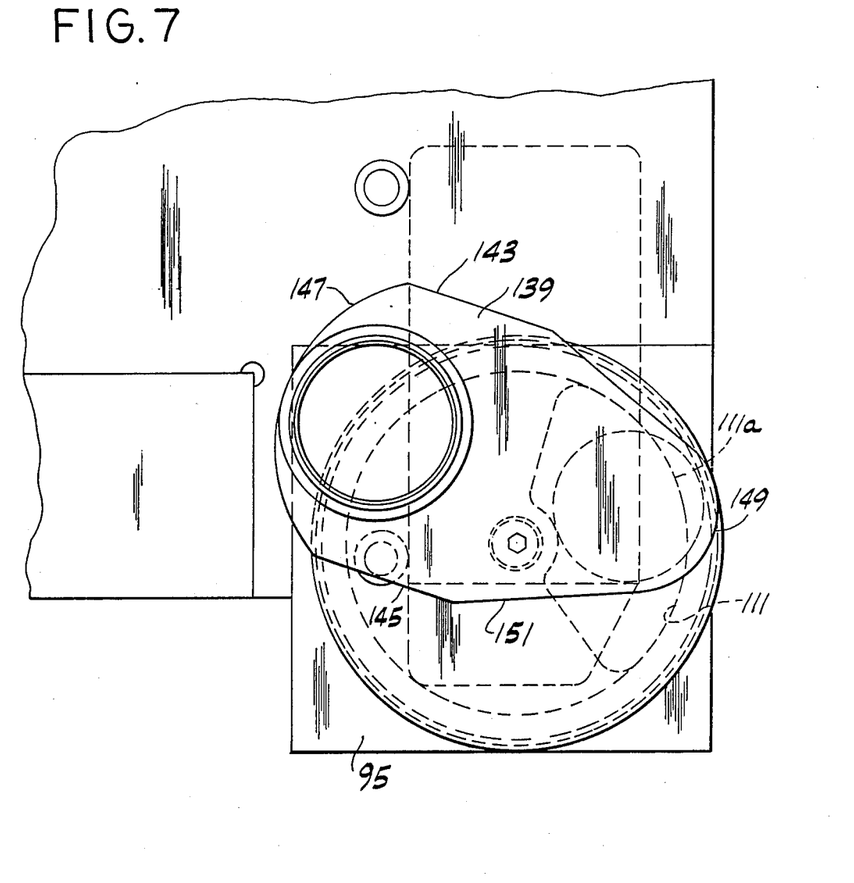
FIG. 7 is a horizontal section generally on line 7—7 of FIG. 3.

As previously described, the shaft 9 on which the carriers or arms 7A, 7B are pivoted extends up from the base 11 of the stated section of the glassware forming machine, this base being formed to provide and thereby constituting means providing a chamber 67 for air to be blown into the plenums and thence up through the passages 19 and 21 in the mold halves 1A etc. both when they are in their closed position and when they are in their open position. The base with the chamber 67 therein is sometimes referred to as the "wind box" of the machine. The chamber is supplied with air by a blower (not shown) in a manner well known in the art. Means indicated generally at 69 is provided for delivery of air from the chamber to each plenum 27, this means being such as to allow swinging of the carriers 7A, 7B, and comprising for each plenum (i.e. for each carrier 7A, 7B) means indicated in its entirety by the reference numeral 71 defining an outlet at the top of the base 11 for delivery of air from the air chamber 67. At 73 is generally indicated a closure in the form of a flat circular disk oscillable on a fixed generally vertical center or axis indicated at A2 spaced from the carrier axis A1, this closure having a circular hole 75 extending therethrough from its top to its bottom spaced from axis A2. The bottom wall of the plenum has a circular opening 77 therein, the axis of this opening being indicated at A3.

At 79 is generally indicated means which may be referred to as air duct means for flow of air from the outlet 71 to the plenum 27, this air duct means 79 having a generally horizontal section 81, which may be referred to as an air box, a tubular inlet end section 83 extending down from one end of section 81 into the circular hole 75 in the closure 73, and an outlet end section 85 extending up from the other end of section 81 to opening 77 in the bottom wall of the plenum 27. The inlet end section 83 is in communication at its upper end with section 81 and at its lower end with the outlet 71, and the inlet end section and the disk 73 are relatively rotatable in generally sealed relation with respect to the circular hole 75 in the disk 73. The outlet end section 85 is in communication at its lower end with section 81 and at its upper end with the plenum 27 and the outlet end section and plenum are relatively rotatable in generally sealed relation with respect to the opening in the bottom wall of the plenum.

Figure 8:
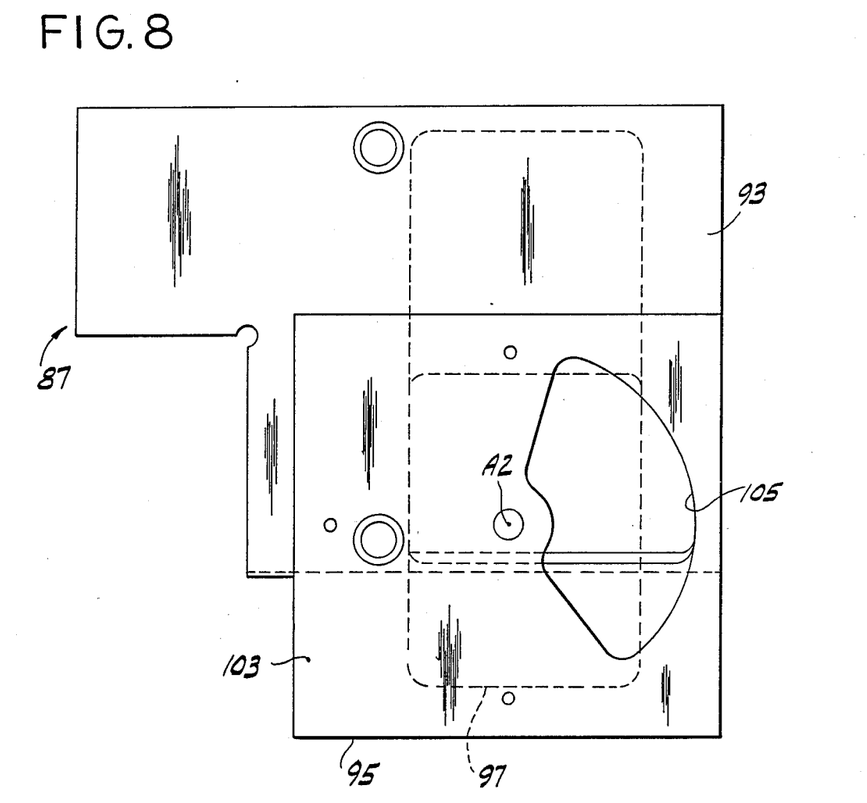
FIG. 8 is a horizontal section generally on line 8—8 of FIG. 3.

The outlet 71 comprises a casing 87 mounted on a spacer plate 89 at the top of the base 11, the casing comprising a body 91 having a relatively shallow part 93 and a part 95 of greater height than the part 93, the raisedheight part 95 being generally rectangular in plan as appears in FIG. 8. The body 91 is formed with a downwardly opening recess 97 therein which is in communication with chamber 67 in the base 11 via an opening 99 in the spacer plate 89 and an opening in the top of the base, and has a top wall 103 with an opening 105 therein which, as shown in FIG. 8, may be generally in the form of a sector of a circle centered at A2. Secured in stationary relation on top of the body 91 is a generally flat circular outlet top member constituted by a disk 107 having an opening 111 registering with the opening 105 in the top wall 103 of the outlet body.

The axis of the rotary circular closure or disk 73 coincides with the central vertical axis of the stationary or fixed disk 107 The closure disk is pivoted for oscillation on this axis by means of a pin 113 threaded at its lower end as indicated at 115 secured in a hole at the center of disk 107, the pin having a head 117 for holding the closure disk down in place.

The rotary closure disk 73 overlies the fixed disk 107, with a clearance space 119 between the bottom surface 121 of the closure disk and the top surface 123 of the fixed disk and the disks are formed to provide adjacent annular rotary surfaces at 125 all around their periphery centered in axis A2, for inhibiting air from escaping at the periphery of the disks from between the disks. For this purpose, the fixed disk 107 is provided with an annular groove 127 in the top thereof (i.e., extending down from the top thereof) adjacent its periphery, and the rotary disk 73 is provided with an annular flange 129 extending down from the bottom thereof adjacent its periphery. The flange has a rotary fit in the groove such as to inhibit escape of air from between the rotary disk and the fixed disk at their periphery, i.e., its radially outer circular face is contiguous to the radially outer circular face of the fixed disk in the groove as indicated at 125a, and its radially inner circular face is contiguous to the radially inner annular face of the fixed disk in the groove as indicated at 125b. The faces at 125a and 125b are cylindrical surfaces. There is some clearance between the lower edge of the flange and the bottom of groove 127 and between the bottom of disk 73 and the top of disk 107 outwardly of the groove and flange and also inwardly of the groove and flange as appears in FIG. 5. The clearance or spacing between the disks at 119 between the portions of the bottom face of disk 73 bounded by the flange and outward of the flange and the bottom of the flange, on the one hand, and the portions of the upper face of the disk 107 bounded by the groove 127 and outward of the groove is maintained by providing a generally circular series of ball bearings 131 between the disks held in place in a generally circular race or groove 133 in the upper face of disk 107 and a generally circular race or groove 135 in the lower bottom face of disk 73 adjacent and radially inward of the groove 127 and flange 129. The ball bearings constitute anti-friction means between the two disks, the series extending on a circle centered in axis A2 with the series adjacent the groove and flange and interrupted as appears in FIG. 7 to accommodate bushing 83.

The horizontal section or "air box" 81 of the air duct means as shown is of box section, having top and bottom walls 139 and 141, side walls 143 and 145, and curved end walls 147 and 149. The end portion of the air box toward the inlet end section 83 is tapered as indicated at 151. The bottom wall 141 of the box 81 has an opening 153 at the inlet end of the box for the upper end of the inlet end section 83 and the top wall of the box 139 has an opening 155 at the other and outlet end of the box for the lower end of the outlet end section 85. The inlet end section 83 of the air duct means 79 is constituted by a length of tubular stock (e.g., brass stock), which may be referred to as a bushing, having an external flange 157 intermediate its upper and lower ends. The upper end of this section 83 above the flange fits in the hole 153 in the bottom wall 141 of the air box 81 and the lower end of this section below the flange fits in the opening 75 in the closure 73, the flange being sandwiched between and engaging the top of the closure and the bottom of the box, acting as a spacer therebetween. The upper end of the inlet end section or bushing 83 is press fitted (and thus sealed) in the opening 153. The lower end of the air inlet section or bushing 83 below the flange 157 extends down within the hole 75 in the disk 73 generally all the way to the bottom of the disk 73 and is retained in the hole, while being rotatable in the hole in generally sealed relation with respect to the disk 73, by a nut 159 threaded up on the lower end of the bushing in a counterbore 161 at the lower end of the hole and a lock nut 163. The outlet end section 85 of the air duct means 81 is constituted by a length of tubular stock (e.g., brass stock), which may be referred to as a bushing, having an external flange 165 intermediate its upper and lower ends. The lower end of this bushing 85 below the flange 165 is press-fitted in the opening 155 in the top wall of the air box 81 and the upperend of this section above the flange is rotatable in the opening 77 in the bottom wall of the plenum in sealed relation thereto. The flange 165 is sandwiched between and engages the top of the air box and the bottom of the plenum, acting as a spacer therebetween.

With the air inlet section 83 of each air duct means 79 press-fitted at its upper end in the opening 153 in the bottom wall of the respective horizontal air duct section or air box 81 and the air outlet section 85 press-fitted at its lower end in the opening 155 in the top of the air box 81, the section 83, 81 and 85 together form a unitary air duct identified in its entirety by the reference character 79. The parts are so arranged that, with the mold-half carriers 7A and 7B in their closed position, each closure disk 73 and air duct 79 carried thereby occupies a first position as shown in FIG. 1 determined by the location of the center of the opening 77 in the bottom wall of the plenum and outlet end section 85 of the duct relatively close to the parting plane of the mold halves, and the length of the duct therebetween. In the operation of the machine, the mold-half carriers or arms 7A and 7B are cyclically swung between their open and closed positions for the bottle molding process. As each carrier swings out from its closed to its open position, the plenum opening 77 and the outlet end section 85 of the air duct means swing out an arc centered in the carrier axis A1. The outlet end section 85 rotates relative to the plenum in the opening 77 in the latter, in sealed relation thereto. The air duct 79, comprising the duct sections 81, 83 and 85, acting as a link between the respective carrier 7A or 7B and the closure disk 73, rotates the closure disk to a second position such as illustrated at the left of FIG. 2. The inner end section 83 of the air duct rotates relative to the closure disk 73 in the hole 75 in the closure disk, in sealed relation thereto. As each carrier swings back from its open to its closed position, the motion is reversed. The inlet end section 83 of the air duct 79 is open at all times at its lower end for flow of air from chamber 67 through the opening 99 in the spacer plate, the recess 97 in the body 91, the registering openings 105 and 111 in the top wall of the body and the stationary disk, and thence through sections 83, 81 and 85 of the duct to the plenum, air exiting from the plenum and flowing up through the passages 19 and 21 in the mold halves for cooling purposes as the mold halves move in or out and while they dwell in the open or closed position. The arrangement is such as to allow for the constant and relatively free flow of air from the chamber 67 to each of the plenums despite the swing of the plenum about the axis A1.

It is to be observed that air delivered through opening 111 of the outlet means is confined by the rotary closure disk 73 against escaping at the periphery of this disk and flows directly up into the air inlet section 83 of the duct, flows up through the inlet end section 83 to the horizontal section 81 of the duct, flows horizontally through the horizontal section 81 to the air outlet section 85 of the duct, and thence flows up through the latter to the plenum, the flow from the outlet to the plenum essentially involving only two changes in the direction of flow. These are the change from vertical to horizontal in passing from section 83 to section 81 and the change from horizontal to vertical in passing from section 81 to section 85. Thus, pressure drop from the outlet to the plenum is minimized, insofar as possible. Air is effectively confined in the system by the closure disk 73 without undue resistance to its oscillation (which as will appear from a comparison of the position of parts in FIGS. 1 and 2 is through a relatively small angle), by reason of the anti-friction mounting of the disk on the ball bearings 131 and the spacing thereby of the bottom surface 121 of the disk 73 from the top surface 123 of the fixed disk 107.

Figure 9:
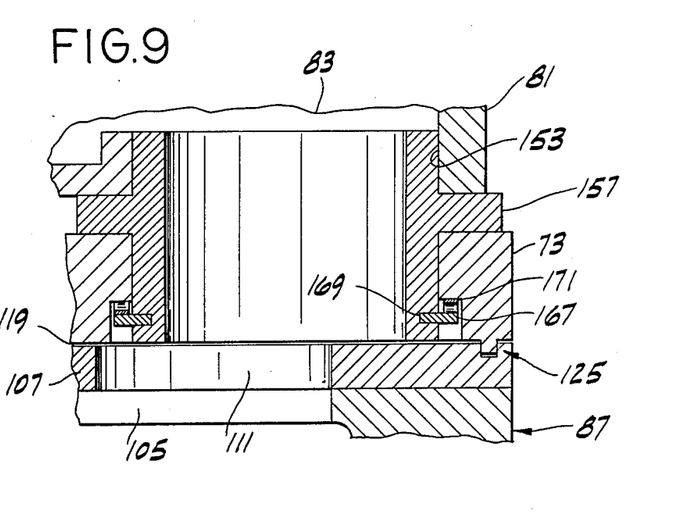
FIG. 9 is a view in section showing a modification.

FIG. 9 illustrates a modification wherein the inlet end section or bushing 83 is retained in the hole 75 in the closure disk 73 by means of a snap ring 167 snapped into an annular peripheral groove 169 in the bushing 83 adjacent its lower end against a spring washer 171.

The invention is described above as used for cooling the mold halves on the blank molding side of the machine. It is also useful, essentially as described above, for cooling mold halves used on the blank forming section of the machine. In the latter case, means may be provided for molding the blank with a neck for the container and a finish, e.g., a screw thread, in the neck, and FIGS. 10–13 show an arrangement for this purpose comprising blank mold halves 2A and 2B, and mating neck mold halves 4A and 4B with special provision for cooling the neck mold halves. As shown, the blank mold halves 2A and 2B are formed to provide, when they are closed, a cavity 6 for molding the blank. Each of these has air passages 8 extending upwardly from the bottom thereof corresponding to the air passages 19, 21 above described. One of the neck mold halves fits in one of the blank mold halves and the other of fits in the other blank mold half when the blank mold halves are closed. It will be understood that the neck mold halves are carried by suitable arms such as indicated in phantom at 10 with means for opening and closing them. The neck mold halves are formed so that, when closed, they define a cavity 12 for molding the neck with the requisite finish, e.g., a screw thread. Each of the neck mold halves is provided with a plurality of grooves such as indicated at 14 extending in vertical planes at the periphery thereof, and each of the blank mold halves has passages such as indicated at 16 extending radially inwardly from respective air passages 8 therein to the grooves for flow of air from the respective air passages 8 to the grooves 12 and thence down in the grooves and out at the bottom of the members 4A and 4B for cooling them. The grooves are conveniently formed by use of a circular cutter as indicated at 18 in phantom in FIG. 13.

Figure 10:
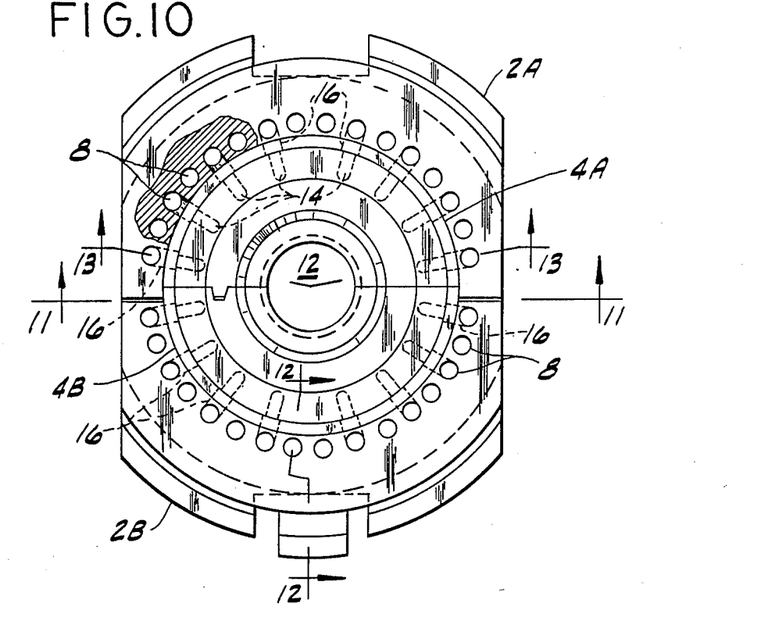
FIG. 10 is a bottom plan (on line 10—10 of FIG. 11) of a set of blank mold halves and neck mold halves which may be used with a cooling system of this invention, and with special provision for cooling the neck mold halves.
Figure 11:
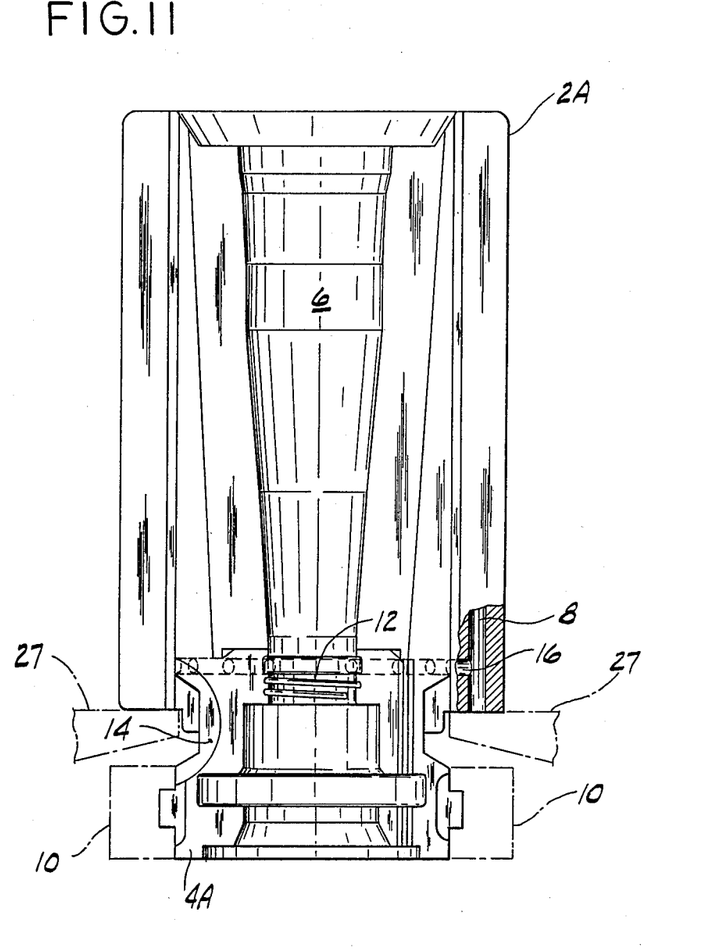
FIG. 11 is a view generally on line 11—11 of FIG. 10, showing one of the blank mold halves and one of the neckmold halves in elevation.
Figure 12:
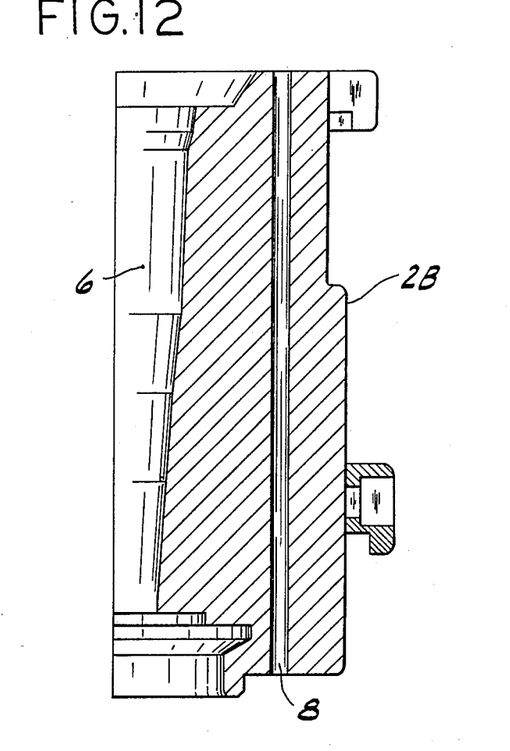
FIG. 12 is a vertical section of a blank mold half per se generally on line 12—12 of FIG. 10.
Figure 13:
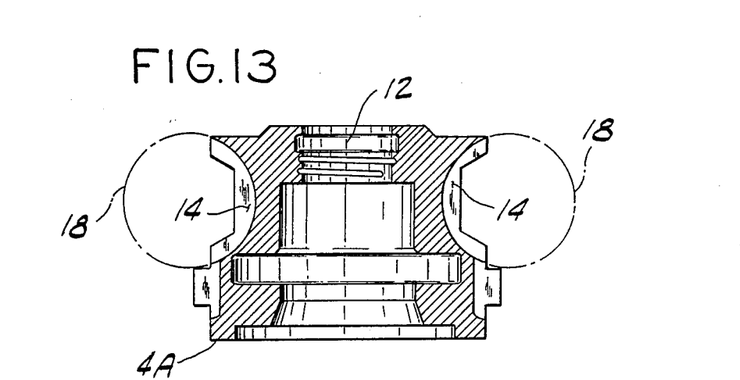
FIG. 13 is a vertical section of a neck mold half generally on line 13—13 of FIG. 10.

As best appears from FIG. 10, radial passages 16 are provided for half of the vertical air passages 8. Thus, sixteen vertical passages 16 are shown in each mold half, and only eight of these have the radial passages 8. As appears in FIG. 11, those vertical passages 8 having the radial passages 16 associated therewith are fully open from their lower end on up to their upper end, but it is also within the purview of the invention to plug those vertical passages 8 having the radial passages 16 associated therewith above the radial passages so that all of the air delivered to each blocked vertical passage is directed through the radial passage for neck half cooling. It may be observed that air is directed to the grooves 14 in the neck mold halves only when the blank mold halves are closed with the neck mold halves clamped therein.

Figure 14:
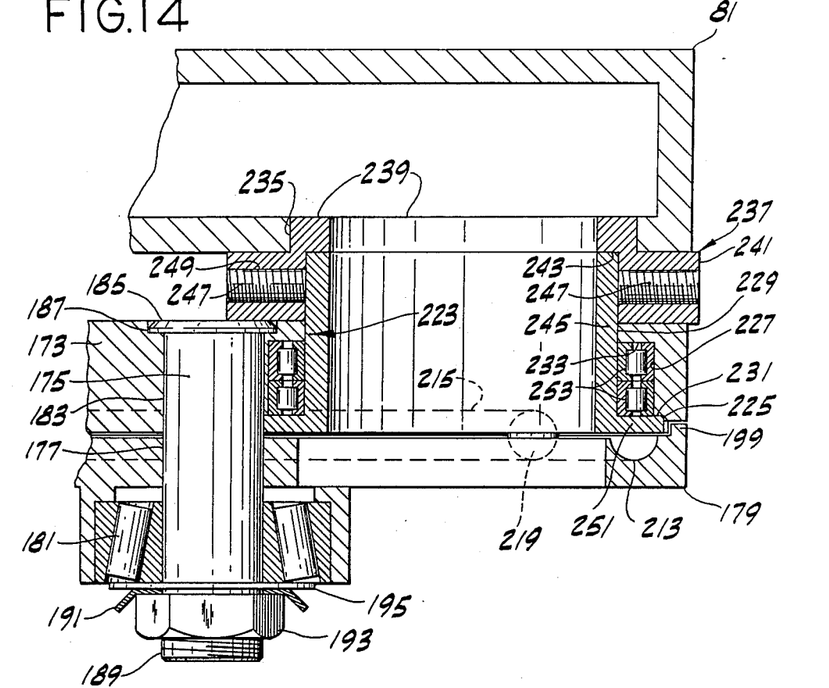
FIG. 14 is a view in section showing a further modification.
Figure 15:
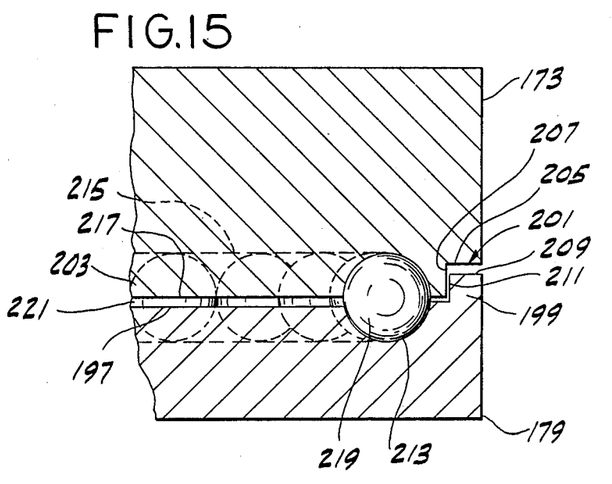
FIG. 15 is an enlarged fragmentary detail section of the FIG. 14 modification.

FIGS. 14 and 15 illustrate a modification wherein the rotary disk, here designated 173, is mounted on the upper end of a relatively short shaft 175 rotatable on a vertical axis in an opening 177 at the center of the fixed disk, here designated 179, and in a roller bearing 181 on the bottom of the fixed disk. The shaft extends up from the fixed disk through a center hole 183 in the rotary disk, having a head 185 at its upper end received in a counterbore 187 at the upper end of the hole 183, and a threaded lower end 189 receiving a lock washer 191 and a nut 193. The lock washer may be of a conventional type such as the type having a key fitting in a keyway in the shaft and tongs bent over on the nut. A seal for the bearing 181 is indicated at 195.

The fixed disk 179 has a flat circular upper face 197 and an upwardly extending annular peripheral flange 199. The rotary disk 173 has an annular peripheral groove 201 at the bottom thereof, thereby having a lower downwardly extending circular portion 203. The groove 201 has a downwardly facing flat annular horizontal surface 205 and an outwardly facing vertical cylindrical surface 207 (constituting the boundary of the circular portion 203). The flange 199 has an upwardly facing flat annular horizontal surface 209 and an inwardly facing vertical cylindric surface 211. The fixed disk 179 has an upwardly opening circular race or groove 213 (corresponding to the race or groove 133 in disk 107) in its circular upper face 197 inside of the flange 199 and the rotary disk 173 has a downwardly opening circular race or groove 215 (corresponding to the race or groove 135 in disk 73) in the bottom face 217 of portion 203 in register with the groove 213 and holding ball bearings 219 (corresponding to the aforesaid ball bearings 131). The rotary disk rides on the ball bearings, the latter maintaining clearance 221 between the upper face 197 of the fixed disk and the lower face 217 of the rotary disk, also maintaining a slight clearance between surfaces 205 and 209. A slight clearance is maintained between the cylindrical surfaces 207 an 211, this clearance being sufficiently small (e.g., 0.015 inch) so that undue escape of air from between the disks at their periphery is inhibited. The rotary disk 173 has a hole 223 (corresponding generally to hole 75 in the disk 73) and the series of ball bearings 219 and groove 215 are interrupted at the hole generally in the same manner as the series of ball bearings 131 is interrupted at the hole 75 in disk 73.

The hole 223 in the rotary disk 173 has a relatively short lower section 225, a relatively long intermediate section 227 of smaller diameter than section 225 and a relatively short upper section 229 of smaller diameter than section 227, these sections forming a downwardly facing lower shoulder 231 at the upper end of section 225 and a downwardly facing upper shoulder 233 at the upper end of section 227. The horizontal section or "air box" 81 of the associated air duct means 79 has an opening 235 in its bottom wall (corresponding to opening 153) aligned with the hole 223. An annular bushing designated in its entirety by the reference number 237 is secured to section 81 of the air duct means in line with the opening 235 and the hole 223 and constitutes a spacer between the top of the rotary disk 173 and the bottom wall of the horizontal section 81 of the air duct means. The bushing has an upper portion 239 press-fitted in the opening 235 and a lower portion 241 of larger outside diameter than the upper portion acting as the spacer. The inside diameter of the lower portion is larger than the inside diameter of the upper portion, forming a downwardly facing annular shoulder 243 within the bushing. The bushing also forms part of the inlet end section of the air duct means, this section further comprising a cylindric tubular member 245 having one end constituting its upper end extending up into the lower part 241 of the bushing to the shoulder 243 and secured therein by means of set screws 247 threaded in tapped radial holes 249 in the lower part of the bushing The tubular member 245 has an outwardly extending annular flange 251 at its lower end received in the lower section 225 of the hole 223 in the rotary disk abutting the aforesaid lower shoulder 231. Bearing means 253, illustrated as comprising an upper and a lower roller bearing, is provided in the intermediate section 227 of the hole 223 for the tubular member 245, the flange 251 extending underneath the bearing means, the latter being held in place between the flange 251 and the aforesaid upper shoulder 233. Thus, the tubular member 245 and the upper part 239 of the bushing together form the inlet end section of the air duct means, the member 245 being rotatable relative to the rotary disk 173 in the hole 223 in the rotary disk in generally sealed relation with respect to the hole 223.

In view of the above, it will be seen that the several objects of the invention are achieved and other advantageous results attained As various changes could be made in the above constructions without departing from the scope of the invention, it is intended that all matter contained in the above description or shown in the accompanying drawings shall be interpreted as illustrative and not in a limiting sense.

What is claimed is:

1. A glassware forming machine comprising:
   a pair of carriers each pivoted on a generally vertical axis for swinging movement toward and away from each other between an open position and a closed position,
   a plurality of mold members carried by each carrier, each mold member on each carrier being related to a mold member on the other so that, with the carriers in their said closed position, each mold member on one carrier mates with a mold member on the other to define a mold cavity for molding an item of glass,
   each mold member having air passages extending upwardly from the bottom thereof for passage of air therethrough for cooling,
   and means for blowing air through said air passages comprising:
   a plenum carried by each carrier for delivering air to the air passages of the mold members carried by the carrier, the mold members extending up from the plenum and the plenum having ports at the top thereof for flow of air up into the passages in the mold members and thence up through and out of said passages,
   means providing a chamber below said carriers for air to be blown into the plenums and thence up through said air passages, and
   means for delivery of air from said chamber means to each plenum allowing swinging of said carriers and comprising, for each carrier:

means defining an air outlet at the top of the chamber means, said air outlet means having a generally flat top with an opening therethrough in communication with said chamber for delivery of air from said chamber up through said opening, a generally flat circular closure for said outlet means oscillable on its center on a generally vertical axis spaced from the carrier axis, said closure overlying the opening in the top of the outlet means, said closure and the top of the outlet means having adjacent annular surfaces centered in the closure axis inhibiting air from escaping at the periphery of the closure from between the closure and the top of the outlet means, said circular closure having a circular hole extending therethrough from its top to its bottom spaced from its axis, the plenum having a bottom wall with an opening therein, air duct means for flow of air from the outlet to the plenum having a generally horizontal section, an inlet end section extending down from one end thereof into the hole in the closure and an outlet end section extending up from the other end thereof to the opening in the bottom wall of the plenum, said inlet end section being in communication at its lower end with said outlet, said inlet end section and said closure being relatively rotatable in generally sealed relation with respect to the circular hole in the closure, said outlet end section being relatively rotatable in generally sealed relation with respect to the opening in the bottom all of the plenum, said circular closure being oscillable on its axis through an angle in one direction from a first position to a second position on swinging of the respective plenum with the respective carrier from open to closed position and back in the opposite direction to its first position on swinging of the respective plenum with the respective carrier back to open position, air flowing up from said outlet passing directly upwardly through the inlet end section to the horizontal section, thence through the horizontal section, and thence up through the outlet end section of the air duct means to the plenum throughout the range of oscillation of the closure.

2. A glassware forming machine as set forth in claim 1 wherein the closure comprises a disk.

3. A glassware forming machine as set forth in claim 2 wherein the outlet has a generally flat circular top member, the closure disk being rotary on said circular top member with a clearance space therebetween, said top member having an opening therein for delivery of air to said space from said chamber.

4. A glassware forming machine as set forth in claim 3 wherein the outlet comprises a body mounted on top of said chamber means having a recess in communication with the chamber provided by said chamber means, said top member comprising a disk fixed on top of said body, said annular surfaces being provided by means of an annular groove in one of said disks adjacent its periphery and an annular flange on the other extending into the groove.

5. A glassware forming machine as set forth in claim 4 having anti-friction means between the two disks.

6. A glassware forming machine as set forth in claim 5 wherein said clearance space is maintained by having the rotary closure disk bear on said anti-friction means.

7. A glassware forming machine as set forth in claim 6 wherein the anti-friction means comprises a circular series of ball bearings.

8. A glassware forming machine as set forth in claim 7 wherein said groove is in the top of the fixed disk and said flange extends down from the rotary closure disk into the groove.

9. A glassware forming machine as set forth in claim 8 wherein the inlet end section is of tubular form with an outwardly extending annular flange between its upper and lower ends, the lower part thereof below said flange extending into the circular hole in the closure and the flange acting as a spacer between the closure disk and the horizontal section.

10. A glassware forming machine as set forth in claim 8 wherein the lower part of the inlet end section extends down within the hole in the closure disk generally to the bottom of the closure disk.

11. A glassware forming machine as set forth in claim 10 having means at the lower end of the lower part of the inlet end section holding it down in the hole in the closure disk.

12. A glassware forming machine as set forth in claim 8 wherein the outlet end section is of tubular form with an outwardly extending flange between its upper and lower ends, the upper part thereof above the flange extending into the opening in the bottom wall of the plenum and acting as a spacer between the horizontal section and the plenum.

13. A glassware forming machine as set forth in claim 8 wherein the bottom of the rotary disk is spaced from the top of the fixed disk radially inwardly and outwardly of the groove and flange, and the said annular surfaces are vertical cylindrical surfaces in the groove.

14. A glassware forming machine as set forth in claim 1 wherein said cavity is a cavity for molding a blank to be transferred to molding means for forming the blank into a container and the machine is provided with means for molding the blank with a neck for the container and a finish on the neck, said neck-molding means comprising a pair of mating neck mold halves one of which fits in one of said mold members and the other of which fits in the other of said mold members at the lower end thereof, said neck mold halves when closed defining a cavity for the molding of the neck and the finish, each of said neck mold halves having a plurality of grooves extending vertically in the periphery thereof and each of said mold members having passages extending inwardly from at least one of said air passages therein to the grooves in the periphery of the neck mold halves for flow of air from said air passages to the grooves and thence down in the groves and out at the bottom of the mold members for cooling the neck mold halves.

15. A glass container forming machine comprising:
a pair of carriers each pivoted on a first generally vertical axis for swinging movement toward and away from each other between an open position and a closed position,
a plurality of mold members carried by each carrier, each mold member on each carrier being related to a mold member on the other so that, with the carriers in their said closed position, each mold member on one carrier mates with a mold member on the other to define a mold cavity for molding a blank to be transferred to molding means for forming the blank into a container, each mold member having air passages extending upwardly from the bottom thereof for passage of air therethrough for cooling, means for blowing air through said air passages comprising:

a plenum carried by each carrier for delivering air to the air passages of the mold members carried by the carrier, the mold members extending up from the plenum and the plenum having ports at the top thereof for flow of air up into the passages in the mold members and thence up through and out of said passages, means providing a chamber below said carriers for air to be blown into the plenums and thence up through said air passages, and means for delivering of air from said chamber means to each plenum allowing swing of the carriers, said machine having means for molding the blank with a neck for the container and a finish on the neck, said neck-molding means comprising a pair of mating neck mold halves one of which fits in one of said mold members and the other of which fits in the other of said mold members at the lower end thereof, said neck mold halves when closed defining a cavity for the molding of the neck and the finish, each of said neck mold halves having a plurality of grooves extending vertically in the periphery thereof, and each of said mold members having passages extending inwardly from respective air passages therein to the grooves in the periphery of the neck mold halves for flow of air from said respective air passages to the grooves and thence down in the grooves and out at the bottom of the mold members for cooling the neck mold halves.

16. A glassware forming machine as set forth in claim 4 wherein the hole in the rotary closure disk is formed to provide a downwardly facing shoulder adjacent it upper end, wherein the horizontal section of the air duct means has a bottom wall with an opening therein aligned with said hole, said machine further having an annular bushing secured to said horizontal section of the air duct means in line with said opening and with said hole and constituting a spacer between the top of the rotary closure disk and the bottom wall of the horizontal section of the air duct means, said inlet end section of the air duct means comprising a cylindric tubular member having one end constituting its upper end extending up into said annular bushing and secured therein, and extending down through the hole in the rotary closure disc to the bottom thereof, said hole in the rotary closure disk having bearing means therein for said tubular member and said tubular member having an outwardly extending annular flange at its other end constituting its lower end extending underneath the bearing means, the bearing means being between said flange and said shoulder.

17. A glassware forming machine as set forth in claim 16 wherein the fixed disk has a central opening therein, the rotary closure disk is mounted on a central shaft extending down through said central opening, and said fixed disk has bearing means at the bottom thereof for the said shaft.

18. A glassware forming machine as set forth in claim 17 wherein the hole in the rotary closure disk has a lower section, an intermediate section of smaller diameter than the intermediate section and an upper section of smaller diameter than the intermediate section, providing a downwardly facing lower shoulder at the upper end of the lower section, said flange seating against said lower shoulder.

19. A glassware forming machine as set forth in claim 18 wherein said annular bushing has an upper portion press-fitted in said opening in the bottom wall of the horizontal section of the air duct means and a lower portion fitting between the top of the rotary disk and the bottom wall of the horizontal section of the air duct means acting as the spacer, and wherein the upper end of said cylindric tubular member is secured in said lower portion of said annular bushing by set screws threaded in radial holes in said lower portion of the bushing.

* * * * *